United States Patent
Birecki et al.

(10) Patent No.: US 6,944,114 B2
(45) Date of Patent: Sep. 13, 2005

(54) CONTACT PROBE STORAGE DEVICE INCLUDING CONDUCTIVE READOUT MEDIUM

(75) Inventors: Henryk Birecki, Palo Alto, CA (US); Robert G. Walmsley, Palo Alto, CA (US); Steven L. Naberhuis, Freemont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 475 days.

(21) Appl. No.: 10/322,173

(22) Filed: Dec. 17, 2002

(65) Prior Publication Data

US 2004/0113641 A1 Jun. 17, 2004

(51) Int. Cl.⁷ .................................................. G11B 9/00
(52) U.S. Cl. ....................... 369/126; 369/100; 250/306; 250/307

(58) Field of Search ................................. 369/126, 100, 369/275.1, 47.1, 53.1; 250/306, 307

(56) References Cited

U.S. PATENT DOCUMENTS

| | | | | |
|---|---|---|---|---|
| 4,427,840 A | * | 1/1984 | Waldrop et al. | ............. 136/255 |
| 5,732,053 A | * | 3/1998 | Yano et al. | ............. 369/53.41 |
| 5,835,477 A | | 11/1998 | Binnig et al. | |
| 2002/0066855 A1 | | 6/2002 | Choi et al. | |

* cited by examiner

*Primary Examiner*—Muhammad Edun

(57) ABSTRACT

A data storage device includes a storage medium and a contact probe. The storage medium includes a first polymeric layer, and a second polymeric layer on the first polymeric layer. The first polymeric layer is electrically conductive. The contact probe faces the second polymeric layer.

21 Claims, 1 Drawing Sheet

CONTACT PROBE STORAGE DEVICE INCLUDING CONDUCTIVE READOUT MEDIUM

BACKGROUND

For decades researchers have been working to increase storage density and reduce storage cost of data storage devices such as magnetic hard drives, optical drives, and semiconductor random access memory. However, increasing the storage density is becoming increasingly difficult because conventional technologies appear to be approaching fundamental limits on storage density. For instance, data storage based on conventional magnetic recording is rapidly approaching fundamental physical limits such as the super-paramagnetic limit, below which magnetic bits are not stable at room temperature.

Storage devices that do not face these fundamental limits are being researched. An example of such an information storage device is described in Choi et al. U.S. Patent Application Publication Ser. No. 2002/0066855 A1 (the "Publication"). According to the Publication, an apparatus for recording and reading data includes a contact probe and a storage medium. In one embodiment, the storage medium is formed from a substrate, a conductive layer on the substrate, and a dielectric layer on the conductive layer. The probe records data in the storage medium by forming holes in the dielectric layer. The holes expose the surface of the conductive layer. During read operations, the probe is scanned across the storage medium. When the tip of the probe encounters a hole, the tip falls into the hole, and a short occurs between the probe tip and conductive layer.

The Publication acknowledges that abrasion of the probe tip is a problem with the first embodiment. The abrasion can occur during read and write operations, when the probe tip makes contact with the conductive layer. The abrasion causes the tip to wear. The wear can shorten the life of the storage device.

The Publication discloses a second embodiment, in which the storage medium is formed from a substrate and a conductive polymeric layer on the substrate. Data is recorded by forming holes in the conductive polymeric layer. The data is read by scanning the probe is scanned across the conductive polymeric layer. A short between the tip and the conductive polymeric layer is supposed to occur when the probe passes over the conductive polymeric layer; and a short is not supposed to occur when the tip passes over a hole. The Publication claims that the second embodiment reduces abrasion of the tip and has a fast data read speed.

SUMMARY

According to one aspect of the present invention, a data storage device includes a storage medium and a contact probe. The storage medium includes a first polymeric layer, and a second polymeric layer on the first polymeric layer. The first polymeric layer is electrically conductive. The contact probe faces the second polymeric layer.

Other aspects and advantages of the present invention will become apparent from the following detailed description, taken in conjunction with the accompanying drawings, illustrating by way of example the principles of the present invention.

DETAILED DESCRIPTION

Figure 1:
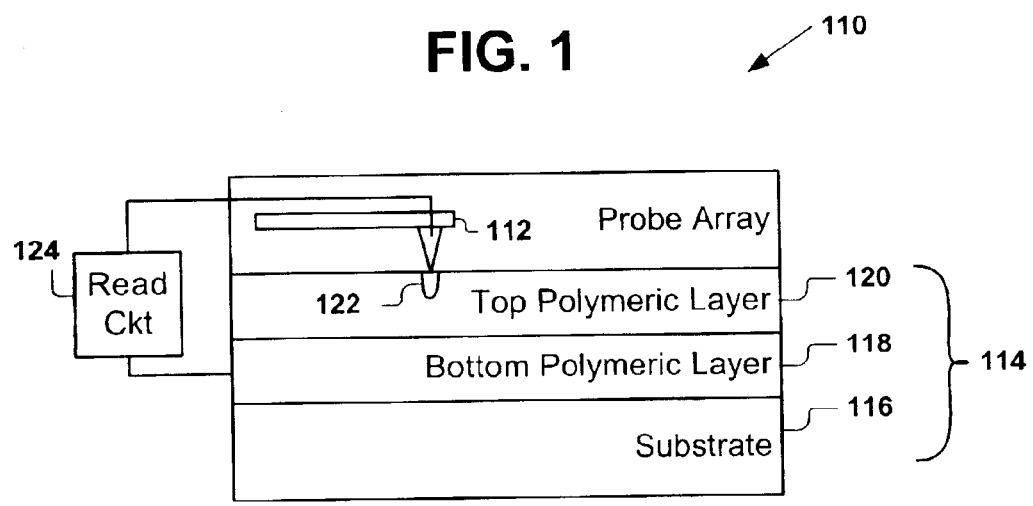
FIG. 1 is an illustration of a data storage device according to a first embodiment of the present invention.

Referring to FIG. 1, a data storage device 110 includes an array of contact probes 112 and a storage medium 114. The storage medium 114 includes a substrate 116, a bottom polymeric layer 118 on the substrate 116, and a top polymeric layer 120 on the first polymeric layer 118.

The contact probes 112 face the top polymeric layer 120. Only a single contact probe 112 is shown to simplify the illustration; in practice, the array may include a multitude of contact probes 112. The probes 112 may be stationary relative to the storage medium 114, or they may be scanned across the storage medium 114 during read and write operations. Exemplary contact probes 112 include, without limitation, Spindt tips, silicon tips, and carbon nanotubes. Other exemplary contact probe arrays, as well as mechanisms for scanning the arrays across the storage medium 114, are disclosed in U.S. Pat. No. 5,835,477.

The top polymeric layer 120 functions as a data recording layer. The top polymeric layer 120 is made of a material that allows the contact probes 112 to make topological changes in the top polymeric layer 120. Examples of topological changes include indentations, and through-holes that expose the bottom polymeric layer 118. An Indentation-type topological change is illustrated in FIG. 1; a through-hole-type topological change is not illustrated.

The type of topological change depends in part upon the conductivity of the second layer 120. If the second layer 120 is a dielectric (i.e., non-conductive), the topological changes may be the through-holes. The through-holes may not be erasable if there is conflict between ease of hole opening and wetting of the bottom polymeric layer 118. However, with proper selection of material and proper pressure applied to the probes 112, erasability can be attained.

If the second layer 120 is partially conductive, the topological changes may be indentations 122. The indentations 122 may be erasable if the top polymeric layer 120 is made of a material such as poly(methyl methacrylate) (PMMA) that is doped with an electrically conductive material and that has the proper dynamic viscosity and surface tension. Resistance of the top polymeric layer 120 is modulated by the depth of the indentations 122.

The bottom polymeric layer 118 serves several functions: it functions as an anti-wear layer; a backing layer that blocks propagation of topological changes in the top polymeric layer 120; and a conductive layer that carries current from the top polymeric layer 118 to a read circuit 124. Because the bottom layer 118 is polymeric, it reduces the wear on the contact probes 112. The bottom polymeric layer 118 may be made of a material that has a higher glass transition temperature than the material of the top polymeric layer 120 so as to block the propagation of the topological changes.

The bottom polymeric layer 118 may be made of a conductive polymer such as a polymer used for organic LEDs. In the alternative, the bottom polymeric layer may be made of a polymer combination that results in a conductive material. For example, poly(3,4-ethyleneoxythiophene) (PEDT) may be doped with poly(styrenesulfonate) (PSS). As another example, the bottom polymeric layer 118 may be made of a thermoset that is doped with a conductive material.

The substrate 116 is not limited to any particular material. Exemplary materials for the substrate include glass, metal, and semiconductors.

During read operations, the tip of a contact probe 112 makes contact with the surface of the top polymeric layer 120 and is moved across the surface of the top polymeric layer 120. When the probe falls into an indentation or through-hole, the resistance of the top polymeric layer 120 changes. The read circuit 124, is connected between the contact probe 112 and the bottom polymeric layer 118, may measure the modulation of the resistivity of the top polymeric layer 120.

Figure 2:
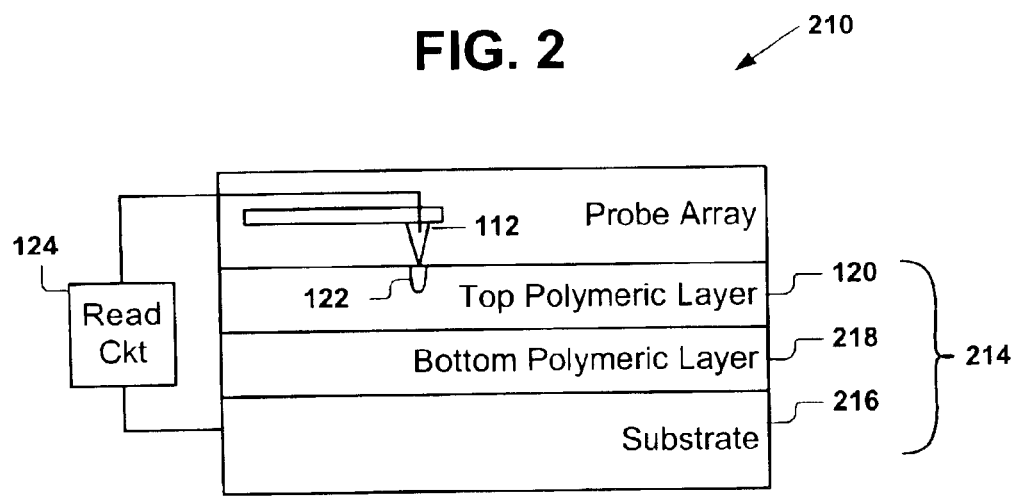
FIG. 2 is an illustration of a data storage device according to a second embodiment of the present invention.

Reference is now made to FIG. 2, which illustrates a second data storage device 210. The second data storage device 210 may have the same probe array and top polymeric layer 120 as the first data storage device 110. However, the substrate 216 of the second data storage device 210 functions as the conductive layer. The substrate 216 carries current from the bottom polymeric layer 218 to the read circuit 124. The bottom polymeric layer 218 functions as an anti-wear layer and a backing layer, but not as a conductive layer. The bottom polymeric layer 218 should have a conductivity that is sufficient to carry current from the backing layer to the substrate 216. However, the bottom polymeric layer 218 of the second data storage device 210 carries current over a shorter distance than the bottom polymeric layer 118 of the first data storage device 110; therefore, the resistivity of the bottom polymeric layer 218 of the second data storage device 210 may be orders of magnitude larger than that of the bottom polymeric layer 118 of the first data storage device 110. The bottom polymeric layer 218 may be made of a polymer such as PEDT, but with much less PSS. The read circuit 124 is connected between the contact probe 112 and the substrate 216 to measure the modulation of the resistivity of the top polymeric layer 120.

Thus disclosed are contact probe storage devices 110 and 210 including storage media 114 and 214 that reduce wear of the contact probes 112. Such storage media 114 and 214 extend the life of their data storage devices 110 and 210, while allowing the contact probes 112 to be made of softer materials such as platinum-iridium and tungsten.

Although specific embodiments of the present invention have been described and illustrated, the present invention is not limited to the specific forms or arrangements of parts so described and illustrated. Instead, the present invention is construed according to the claims that follow.

What is claimed is:

1. A data storage device comprising:
    a storage medium including a first polymeric layer, and a second polymeric layer on the first polymeric layer, the first polymeric layer being electrically conductive; and
    a contact probe facing the second polymeric layer.
2. The device of claim 1, wherein the contact probe creates topological changes in the second polymeric layer during write operations.
3. The device of claim 2, wherein the second polymeric layer is electrically conductive; and wherein the topological changes include indentations in the second polymeric layer, the indentations not extending to the first polymeric layer.
4. The device of claim 2, wherein the second polymeric layer is non-conductive; and wherein the topological changes include through-holes in the second polymeric layer.
5. The device of claim 1, wherein the first polymeric layer has a higher glass transition temperature than the second polymeric layer.
6. The device of claim 1, wherein the first polymeric layer functions as a conductive layer.
7. The device of claim 6, further comprising a circuit, connected between the probe and the first polymeric layer, for measuring resistivity modulation of the second polymeric layer.
8. The device of claim 1, further comprising a substrate for supporting the first polymeric layer, electrical conductivity of the substrate being orders of magnitude greater than electrical conductivity of the first polymeric layer.
9. The device of claim 8, further comprising a circuit, connected between the probe and the substrate, for measuring resistivity modulation of the second polymeric layer.
10. A storage medium for a contact probe data storage device, the medium comprising a substrate; a first polymeric layer on the substrate, and a second polymeric layer on the first polymeric layer, the first polymeric layer being electrically conductive.
11. The storage medium of claim 10, wherein the first polymeric layer has a higher glass transition temperature than the second polymeric layer.
12. The storage medium of claim 10, wherein the first polymeric layer functions as a conductive layer.
13. The storage medium of claim 10, wherein electrical conductivity of the substrate is orders of magnitude greater than electrical conductivity of the first polymeric layer.
14. A data storage device comprising:
    a storage medium including a substrate, first polymeric layer on the substrate, and a second polymeric layer on the first polymeric layer, the first polymeric layer being electrically conductive; and
    a contact probe facing the second polymeric layer;
    the first polymeric layer functioning as a conductive layer, a backing layer, and an anti-wear layer.
15. The device of claim 14, further comprising a circuit, connected between the probe and the first polymeric layer, for measuring resistivity modulation of the second polymeric layer.
16. The device of claim 14, wherein the second polymeric layer is electrically conductive; and wherein the contact probe makes indentations in the second polymeric layer during write operations, the indentations not extending to the first polymeric layer.
17. The device of claim 14, wherein the second polymeric layer is non-conductive; and wherein the contact probe makes through-holes in the second polymeric layer during write operations.
18. A data storage device comprising:
    a storage medium including a substrate, a first polymeric layer on the substrate, and a second polymeric layer on the first polymeric layer, the first polymeric layer being electrically conductive; and
    a contact probe facing the second polymeric layer, the first polymeric layer functioning as a backing layer, and an anti-wear layer;
    the substrate functioning as a conductive layer.
19. The device of claim 18, further comprising a circuit, connected between the probe and the substrate, for measuring resistivity modulation of the second polymeric layer.
20. The device of claim 18, wherein the second polymeric layer is electrically conductive; and wherein the contact probe makes indentations in the second polymeric layer during write operations, the indentations not extending to the first polymeric layer.
21. The device of claim 18, wherein the second polymeric layer is non-conductive; and wherein the contact probe makes through-holes in the second polymeric layer during write operations.

* * * * *